United States Patent
Cui et al.

(10) Patent No.: US 12,415,267 B2
(45) Date of Patent: Sep. 16, 2025

(54) SYNTHESIZING MACHINE LEARNING-BASED CONTROLLERS FOR UNDERACTUATED ROBOTIC MANIPULATORS

(71) Applicant: Siemens Aktiengesellschaft, Munich (DE)

(72) Inventors: Yingnan Cui, Princeton, NJ (US); Yaofeng Zhong, West Windsor, NJ (US); Georgia Olympia Brikis, Plainsboro, NJ (US); Amit Chakraborty, East Windsor, NJ (US); Biswadip Dey, Bothell, WA (US)

(73) Assignee: Siemens Aktiengesellschaft, Munich (DE)

( * ) Notice: Subject to any disclaimer, the term of this patent is extended or adjusted under 35 U.S.C. 154(b) by 301 days.

(21) Appl. No.: 18/325,537

(22) Filed: May 30, 2023

(65) Prior Publication Data

US 2024/0399568 A1     Dec. 5, 2024

(51) Int. Cl.
    *B25J 9/16*          (2006.01)
(52) U.S. Cl.
    CPC .............. *B25J 9/161* (2013.01); *B25J 9/163* (2013.01)
(58) Field of Classification Search
    CPC .................................. B25J 9/161; B25J 9/163
    See application file for complete search history.

(56) References Cited

U.S. PATENT DOCUMENTS

| | | | |
|---|---|---|---|
| 7,190,141 B1* | 3/2007 | Ashrafiuon | B25J 9/0006 318/568.14 |
| 2014/0107569 A1* | 4/2014 | Fischer | A61B 34/37 604/95.01 |
| 2020/0180141 A1* | 6/2020 | Dong | B62D 37/06 |
| 2023/0339106 A1* | 10/2023 | Lu | B25J 9/1625 |
| 2023/0347501 A1* | 11/2023 | Wang | B25J 9/1653 |

OTHER PUBLICATIONS

Romeo Ortega, Arjan J. van der Schaft, Iven Mareels, and Bernhard Maschke. "Putting Energy Back in Control". IEEE Control Systems Magazine, 21(2):18-33, Apr. 2001.
Romeo Ortega, Arjan J. Van Der Schaft, Bernhard Maschke, and Gerardo Escobar. "Interconnection and damping assignment passivity-based control of port-controlled Hamiltonian systems." Automatica, 38(4):585-596, 2002.
R Ortega and M. W. Spong, "Adaptive motion control of rigid robots: A tutorial," Automatica, vol. 25, No. 6, pp. 877-888, 1989.

(Continued)

*Primary Examiner* — Dalena Tran (57) ABSTRACT

A computer-implemented system and method for synthesizing a controller for an under actuated robotic manipulator includes a machine learning based model having a plurality of neural network modules. Each module is configured to approximate a function related to an underactuated controller for a robotic manipulator. Parameters of each function are learned during training of the model using a loss function that satisfies one or more conditions including structure preservation, integrability and equilibrium assignment.

20 Claims, 4 Drawing Sheets

(56) References Cited

OTHER PUBLICATIONS

R. Ortega, M. W. Spong, F. G'omez-Estern, and G. Blankenstein, "Stabilization of a class of underactuated mechanical systems via interconnection and damping assignment," IEEE transactions on automatic control, vol. 47, No. 8, pp. 1218-1233, 2002.

S. Sanchez-Escalonilla, R. Reyes-Baez, and B. Jayawardhana, "Total energy shaping with neural interconnection and damping assignment-passivity based control," Proceedings of Machine Learning Research vol. 168: 1-12, 2022.

A. D. Mahindrakar, A. Astolfi, R. Ortega, and G. Viola, "Further constructive results on interconnection and damping assignment control of mechanical systems: The Acrobot example," International Journal of Robust and Nonlinear Control: IFAC-Affiliated Journal, vol. 16, No. 14, pp. 671-685, Jul. 2006.

\* cited by examiner

SYNTHESIZING MACHINE LEARNING-BASED CONTROLLERS FOR UNDERACTUATED ROBOTIC MANIPULATORS

TECHNICAL FIELD

This application relates to automation control. More particularly, this application relates to a neural network-based model to enable controller synthesis for underactuated robotics manipulators.

BACKGROUND

In the field of automation, robotic manipulators can perform repetitive tasks with high accuracy. A class of robotic manipulators are underactuated, which means there are fewer actuators than available degrees of freedom. For example, a robotic arm may have three joints but one of the joints lacks an actuator to directly drive motion at that joint. A well-known example of an underactuated body used in research is the Acrobot, which is a planar two-link robotic arm in the vertical plane (working against gravity), with an actuator at the elbow, but no actuator at the shoulder. Designing a stabilizing controller for under-actuated robotic manipulators is generally more challenging than designing one for fully actuated systems in which actuation exists for all degrees of freedom. The reason for this is that fully actuated systems are feedback equivalent, whereas underactuated systems are not. When the dynamics of the system are nonlinear, the feedback controller design is drastically complicated. Existing research has applied a sequence of controllers in specific systems for stabilization. A promising general purpose controller design is the interconnection and damping assignment passivity-based control (IDA-PBC). However, the design procedure is conceptual instead of constructive.

Passivity-based control (PBC) has been proposed in previous studies as a controller design technique to passivize the system using a storage function. It has been shown that potential energy shaping can successfully stabilize simple mechanical systems when setting the total energy to be the difference between stored and supplied energies. For applications that also require modification of the kinetic energy, IDA-PBC methods have been introduced to stabilize port-controlled Hamiltonian (PCH) models. Although one can design a controller using the IDA-PBC method, such a solution requires solving a set of partial differential equations and can be very tedious. A recent work used physics-informed neural networks to bypass the solution of PDEs but were applied only on fully actuated systems. A solution is needed for stabilizing underactuated systems.

SUMMARY

A computer-implemented system and method for synthesizing a controller for an under actuated robotic manipulator includes a machine learning based model having a plurality of neural network modules. Each module is configured to approximate a function related to an underactuated controller for a robotic manipulator. Parameters of each function are learned during training of the model using a loss function that satisfies one or more conditions including structure preservation, integrability and equilibrium assignment.

BRIEF DESCRIPTION OF THE DRAWINGS

Non-limiting and non-exhaustive embodiments of the present disclosure are described with reference to the following FIGURES, wherein like reference numerals refer to like elements throughout the drawings unless otherwise specified.

DETAILED DESCRIPTION

Methods and systems disclosed herein provide a technical solution for controlling underactuated dynamic machines, such as robotic arms or manipulators. The technical problem to be solved is to improve a control feedback process for an underactuated robotic manipulator operating in real time with respect to the proper level of actuator force or torque to drive the robotic manipulator into a desired position. A governing control law for this process can be expressed by PDEs that represent dynamics of the physical system, such as momentum and position for a robotic manipulator with respect to system coordinates. A model is constructed that is capable of learning an underactuated dynamic system based on interconnection and damping assignment passivity-based control (IDA-PBC) of the system. The model provides a data driven technical solution for estimating functions required for deriving a controller for a given momentum and position value pair. The model is configured to solve complex PDEs applicable for a generic class of systems by leveraging neural networks to control and stabilize underactuated systems. In contrast, traditional approaches use several mathematical simplifications and assumptions to solve the PDEs analytically for a specialized system on a case-by-case scenario, and for some underactuated robotic systems, such analytical PDE solutions are impracticable and not derivable.

Figure 1:
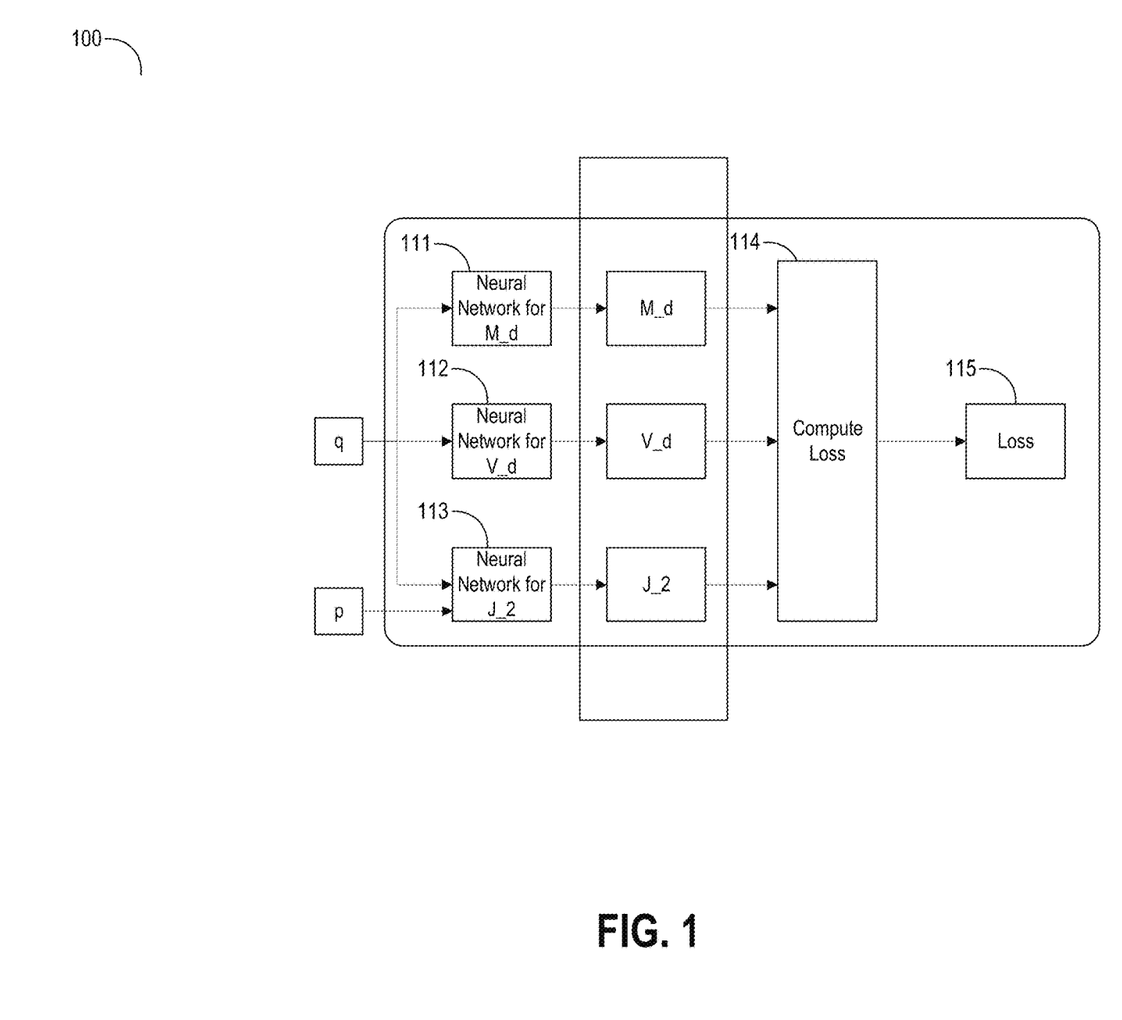
FIG. 1 illustrates an example of a parameterized model in training mode for learning function approximators useful for synthesizing a dynamic controller of an underactuated robotic manipulator in accordance with embodiments of this disclosure.

FIG. 1 illustrates an example of a parameterized model in training mode for learning function approximators useful for synthesizing a dynamic controller of an underactuated robotic manipulator in accordance with embodiments of this disclosure. To describe the feedback controlled physical system being modeled, state variables for position q and momentum p are defined. In an embodiment, system dynamics can be described using port-Hamiltonian dynamics with control u and can be expressed as follows in terms of time dependent derivative values of position q (i.e., velocity) and momentum p (i.e., force):

$$\begin{bmatrix} \dot{q} \\ \dot{p} \end{bmatrix} = \begin{bmatrix} 0 & I_n \\ -I_n & 0 \end{bmatrix} \begin{bmatrix} \nabla_q H \\ \nabla_p H \end{bmatrix} + \begin{bmatrix} 0 \\ G(q) \end{bmatrix} u \qquad (1)$$

where I is the identity matrix, u represents the feedback control (or the desired response), and H is a scalar function of q and p, which is referred to as the Hamiltonian, with the following form:

$$H(q, p) = \frac{1}{2}p^T M^{-1}(q)p + V(q) \qquad (2)$$

and where G denotes the q-dependent input matrix. From equation (2) above, it can be seen that the Hamiltonian represents the system total energy, which is the sum of the kinetic energy and the potential energy V.

The IDA-PBC framework is used to find a controller u in equation (1) such that the controlled system behaves like a desired system expressed as follows:

$$\dot{x} = [J_d(x) - R_d(x)]\nabla_x H_d(x) \qquad (3)$$

for sample phase space x=(q,p). Port power variable u defines power flows exchanged with the environment of the system, such as forces and velocities in a mechanical system, to which a control input to the controller can be derived for a desired response to the current state of the robotic manipulator. The interconnection structure is captured in a desired n×n skew-symmetric matrix $J_d(x)$, while desired damping is represented by damping matrix $R_d(x)$, both matrices smoothly dependent on state x. The desired system $\dot{x}$ is another port-controlled Hamiltonian system with desired Hamiltonian $H_d$, which can be expressed as follows:

$$H_d(q, p) = \frac{1}{2}p^T M_d^{-1}(q)p + V_d(q) \qquad (4)$$

where $M_d$ is the desired mass matrix and $V_d$ is the desired potential energy.

As shown in FIG. 1, the model 100 includes three neural networks 111, 112, 113, each configured respectively as function approximators to learn desired mass matrix Ma, desired potential energy matrix $V_d$, and interconnection matrix $J_2$ that satisfy the requirements for a successful controller. Here, interconnection matrix $J_2$ is a function of q and p and has free parameters in order to achieve the kinetic energy shaping. In an embodiment, matching conditions are obtained by matching the right-hand side of equation (1) and equation (3). The technical challenge of an IDA-PBC method is to find $H_d$, $J_d$, $R_d$ to satisfy the matching conditions. This is especially challenging when the system is underactuated, i.e., the number of effective control inputs are smaller than the degrees of freedom for the system. As an example, when searching for good candidates for $J_d$ and $R_d$, the following representations may be defined:

$$J_d(x) = J_d(q, p) = \begin{bmatrix} 0 & M^{-1}(q)M_d(q) \\ -M_d(q)M^{-1}(q) & J_2(q, p) \end{bmatrix} \qquad (5)$$

$$R_d(x) = \begin{bmatrix} 0 & 0 \\ 0 & GK_v(x)G^T \end{bmatrix} \qquad (6)$$

The disclosed solution recognizes that matrix Kv can be substituted with a plug-in arbitrary positive-definite matrix, such as the identity matrix, and the controller will properly function. Then the problem is simplified and reduced to determining $M_d$, $V_d$, and $J_2$ such that the following kinetic energy and potential energy matching conditions, respectively, are satisfied.

$$G^\perp \left( \nabla_q (p^T M^{-1} p) - M_d M^{-1} \nabla_q (p^T M_d^{-1} p) + 2J_2 M_d^{-1} p \right) = 0 \qquad (7)$$

$$G^\perp \left( \nabla_q V - M_d M^{-1} \nabla_q V_d \right) = 0 \qquad (8)$$

The above principles are applied by neural networks and other elements of model 100 as follows. Matrix $J_2$ by definition is a skew-symmetric matrix. Its diagonal elements are zeros. Neural network 113 is configured to parametrize the off-diagonal elements and construct the matrix so that the matrix $J_2$ is skew-symmetric. Desired mass matrix $M_d$ by definition is a positive definite matrix. Cholesky factorization is used to decompose matrix $M_d$ into $M_d = LL^T$, where L is a lower-triangular matrix. A feed-forward neural network 111 is used to parametrize the matrix L.

Matrix $V_d$ is the desired potential energy which should be positive over a reasonable domain. It should also have the property of $V_d(0, 0) = 0$, which means that when the state of position and momentum are both at zero value, the potential energy is a zero value. Moreover, the function should be positive definite at the origin. Neural network 112 can be configured in various ways to parametrize the function that has these properties, including the following.

In an embodiment, matrix $V_d$ is configured as an input convex neural network (ICNN) that outputs convex functions. To enforce that the minimum is at the origin, the ICCN is configured to approximate $V_d$ according to the following expression:

$$V_d(x) = h(ICCN(x) - ICNN(0)) \qquad (9)$$

where h( ) is a convex activation function such as Exponential Linear Unit (ELU) function.

In another embodiment, neural network 112 is configured to parametrize the function using input-invex neural networks. Input-invexity is a property that captures the requirement needed to approximate matrix $V_d$.

As another embodiment, sum-of-square (SOS) techniques is applied by neural network 112 to parameterize matrix $V_d$. The idea is to present $V_d$ as a sum of squares of polynomials. To learn a good SOS candidate to solve the control problem, a polynomial basis is pre-defined and the coefficients over this basis is learned during optimization.

Regarding loss function 114 design, the loss function optimizes the solution that satisfies one or more of the following five conditions related to matrix $J_2$, desired mass matrix $M_d$ and potential energy matrix $V_d$. The first three conditions are naturally satisfied by design: structure preservation, integrability, and equilibrium assignment. The fourth condition, Lyapunov stability, is enforced by adding a penalty term in the loss function and using the three implementations to parametrize potential energy matrix $V_d$. A fifth condition is enforcement of the matching conditions based on equations (7) (8), solved as a sum of penalty terms $l_1$ and $l_2$ in the loss function 114 akin to a physics informed NN (PINN), which can be represented according to the following expressions:

$$l_1 = \left\| G^\perp \left( \nabla_q (p^T M^{-1} p) - M_d M^{-1} \nabla_q (p^T M_d^{-1} p) + 2J_2 M_d^{-1} p \right) \right\|_2^2 \qquad (10)$$

$$l_2 = \left\| G^\perp \left( \nabla_q V - M_d M^{-1} \nabla_q V_d \right) \right\|_2^2 \qquad (11)$$

Loss 115 is the sum of $l_1$ and $l_2$.

Model 100 is trained using gradient descent algorithm to update parameters for the neural networks so that each of the functions Md, Vd, J2 is parametrized.

Figure 2:
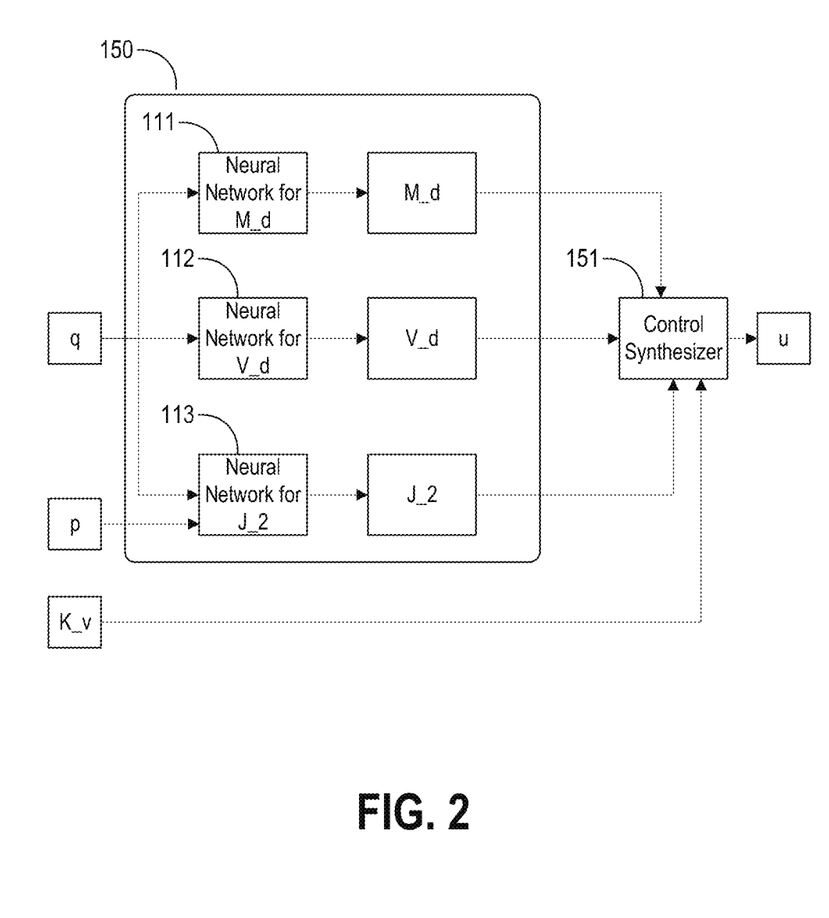
FIG. 2 illustrates an example of a model with neural networks trained to solve partial differential equations for synthesizing a dynamic controller of an underactuated robotic manipulator in accordance with embodiments of this disclosure.

FIG. 2 shows illustrates an example of a trained model 150 with neural networks trained to solve partial differential equations for synthesizing a dynamic controller of an underactuated robotic manipulator in accordance with embodiments of this disclosure. For any given state variable input pair (q,p), and any positive-definite matrix plugged in for input matrix $k_v$, the learned function approximators 111, 112, 113 of trained model 150 provides the required PDE solution matrices $V_d$, $M_d$, and $J_2$ for control synthesizer module 151. In an embodiment, the controller input u is synthesized using the IDA-PBA approach according to a sum of control components $u_{es}$ and $u_{di}$, where energy shaping control $u_{es}$ and damping injection control $u_{di}$ can be represented as follows:

$$u_{es} = (G^T G)^{-1} G^T (\nabla_q H - M_d M^{-1} \nabla_q H_d + J_2 M_d^{-1} p). \quad (12)$$

$$u_{di} = -K_v G^T \nabla_p H_d \quad (13)$$

Figure 3:
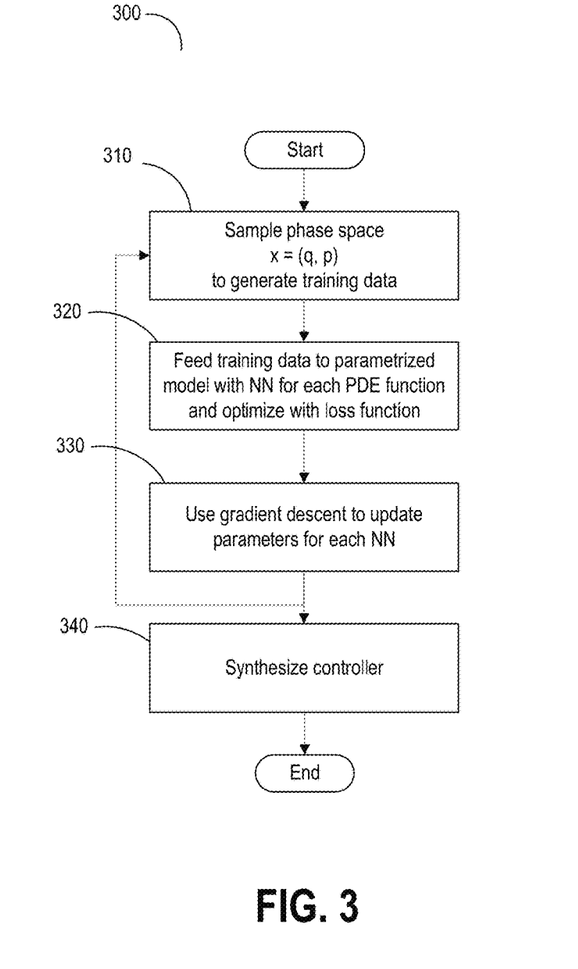
FIG. 3 is a flow diagram illustrating an example of a process for synthesizing a dynamic controller of an underactuated robotic manipulator in accordance with embodiments of this disclosure.

FIG. 3 is a flow diagram illustrating an example of a process for synthesizing a controller in accordance with embodiments of this disclosure. At 310, phase space of the physical system is sampled to generate training data of position and momentum pairings. At 320, training data is fed to parametrized model 100 during training of the model using a loss function that optimizes a solution according to one or more conditions to learn function approximators, shown as NN 111, 112, 113 in FIG. 1, for desired mass $M_d$, desired potential energy $V_d$ and interconnection matrix $J_2$. Gradient descent is used to update neural network parameters for NN 111, 112 and 113 at 330 during training. Learned functions for desired mass matrix $M_d$, desired potential energy matrix $V_d$ and interconnection matrix $J_2$ are used at 340 to synthesize a controller input u according to the IDA-PBC approach.

Figure 4:
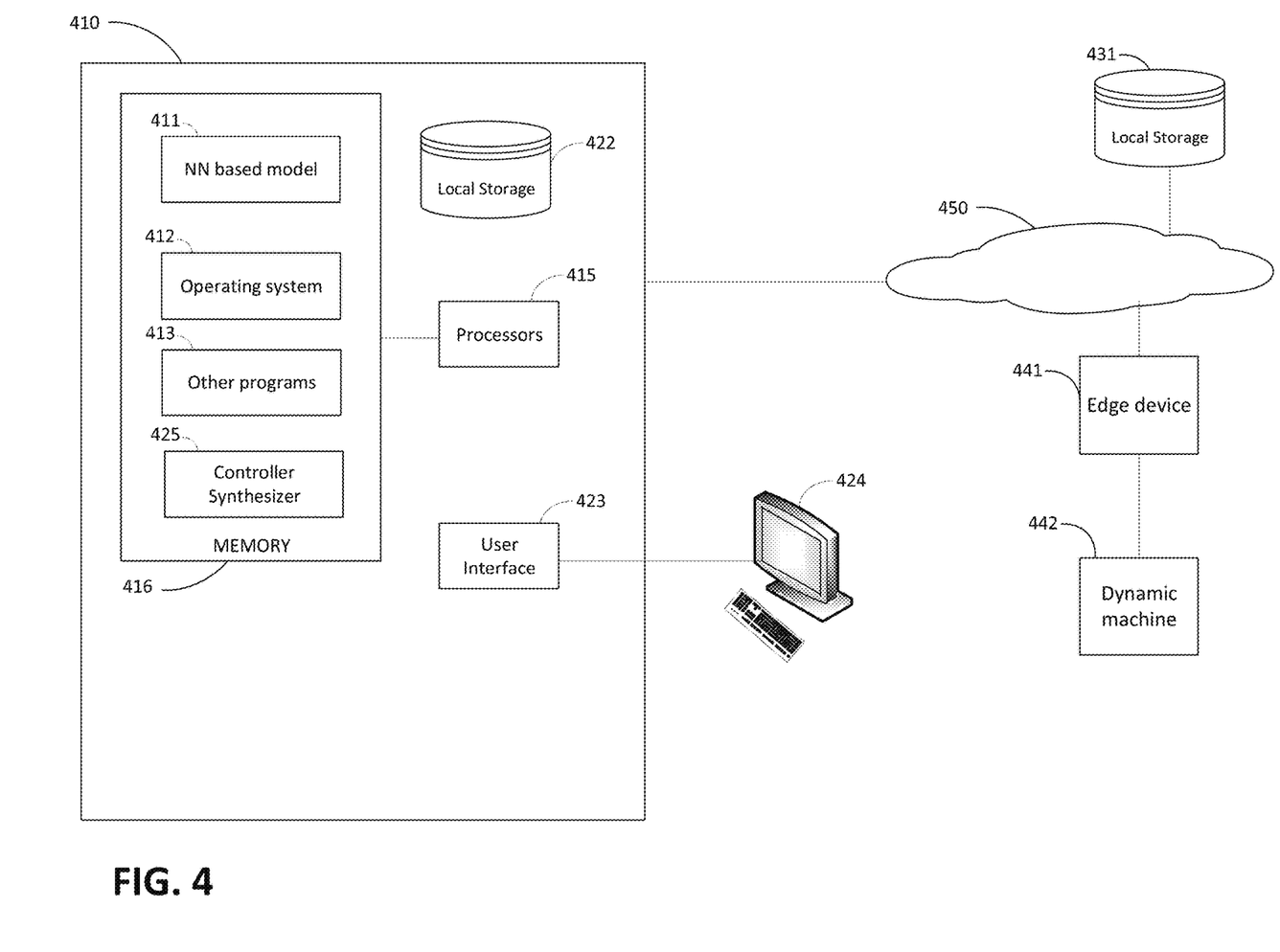
FIG. 4 shows an example of a computing environment in which embodiments of the present disclosure may operate.

FIG. 4 shows an example of a computing environment in which embodiments of the present disclosure may operate. Computer system 410 may be embodied, for example and without limitation, as a computing device for synthesizing controllers of underactuated dynamic systems.

Processors 415 may include one or more GPUs and one or more central processing units (CPUs). System memory 416 stores information and instructions to be executed by processors 415 and may be used for storing temporary variables or other intermediate information during the execution of instructions by processors 415. System memory 416 may contain data and/or program modules that are immediately accessible to and/or presently being operated on by the processors 415, such as Neural Network based model module 411, operating system 412, other programs 413, and controller synthesizer module 425. For this example, module 411 is configured to execute the functionality of the neural network based model 100 (FIG. 1) and trained model 151 (FIG. 2), and synthesizer module 425 is configured to execute the functionality of the controller synthesizer 151 as described above with reference to FIG. 3.

Computing system 410 may also include a user interface module 423 for communicating with a graphical user interface 424 that includes a display device to display information to a computer user, one or more input devices, such as a keyboard or pointing device, for interacting with a computer user and providing information to the processors 415. The display device may provide a touch screen interface which allows input to supplement or replace the communication of direction information and command selections.

The computing system 410 may perform a portion or all of the processing steps of embodiments of the disclosure in response to the processors 415 executing one or more sequences of one or more instructions contained in a memory, such as the system memory 416. Such instructions may be read into the system memory 416 from another computer readable storage medium, such as local storage device 422, implemented as a magnetic hard disk or a removable media drive. The local storage device 422 may contain one or more datastores and data files used by embodiments of the present disclosure. Datastore contents and data files may be encrypted to improve security. The processors 415 may also be employed in a multi-processing arrangement to execute the one or more sequences of instructions contained in system memory 416. In alternative embodiments, hard-wired circuitry may be used in place of or in combination with software instructions. Thus, embodiments are not limited to any specific combination of hardware circuitry and software. Additionally, or alternatively, data storage, such as training data, may be stored and accessed from remote location 431 via network 450.

The computing system 410 may include at least one computer readable storage medium or memory, such as local storage device 422, for holding instructions programmed according to embodiments of the disclosure and for containing data structures, tables, records, or other data described herein. The term "computer readable storage medium" as used herein refers to any medium that participates in providing instructions to the processor 415 for execution. A computer readable storage medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk or removable media drive. Non-limiting examples of volatile media include dynamic memory, such as system memory 416. Non-limiting examples of transmission media include coaxial cables, copper wire, and fiber optics. Transmission media may also take the form of acoustic or light waves, such as those generated during radio wave and infrared data communications. Computer readable program instructions described herein can be downloaded to respective computing/processing devices from a computer readable storage medium or to an external computer or external storage device via a network, for example, the Internet, a local area network, a wide area network and/or a wireless network.

Network 450 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computing system 410 and other computers such as edge computing devices 441. Synthesized controller programs generated by computing device 410 may be communicated to the dynamic machine 442 via edge computing device 441. The network 450 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 450.

The embodiments of the present disclosure may be implemented with any combination of hardware and software. In addition, the embodiments of the present disclosure may be included in an article of manufacture (e.g., one or more computer program products) having, for example, a non-transitory computer-readable storage medium. The computer readable storage medium has embodied therein, for instance, computer readable program instructions for providing and facilitating the mechanisms of the embodiments of the present disclosure. The article of manufacture can be included as part of a computer system or sold separately.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the computing device, partly on the computing device, as a stand-alone software package, partly on the computing device and partly on a remote computer or entirely on the computing device or server. In the latter scenario, the remote computer may be connected to the computing device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The program modules, applications, computer-executable instructions, code, or the like depicted in FIG. 4 as being stored in the system memory 416 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computing system 410, and/or hosted on other computing device(s) accessible via one or more of network, may be provided to support functionality provided by the program modules, applications, or computer-executable code and/or additional or alternate functionality. Further, functionality may be modularized differently such that processing described as being supported collectively by the collection of program modules 411, 412, 413, 425 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 4 may be implemented, at least partially, in hardware and/or firmware across any number of devices.

It should further be appreciated that the computing system 410 may include alternate and/or additional hardware, software, or firmware components beyond those described or depicted without departing from the scope of the disclosure. More particularly, it should be appreciated that software, firmware, or hardware components depicted as forming part of the computing system 410 are merely illustrative and that some components may not be present or additional components may be provided in various embodiments. While various illustrative program modules have been depicted and described as software modules stored in system memory 416, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented system for generating a feedback controller input to control an underactuated robotic manipulator, the system comprising:
a processor; and
memory having modules stored thereon with instructions to be executed by the processor, the modules comprising:
a machine learning based model comprising a plurality of neural network modules, each module configured to approximate one of a plurality of functions related to an underactuated controller for a robotic manipulator, wherein the plurality of functions includes a desired mass, a desired potential energy, and an interconnection matrix;
wherein parameters of each function are learned during training of the model using a loss function that satisfies one or more conditions including structure preservation, integrability and equilibrium assignment;
wherein the trained model generates a desired mass matrix and a desired potential energy matrix to enable synthesis of a feedback controller input.

2. The system of claim 1, wherein the desired mass function is approximated by a neural network configured as a feed-forward neural network to parametrize a lower-triangular matrix L of a decomposed desired mass matrix Md, where $Md=LL^T$.

3. The system of claim 1, wherein the interconnection matrix function is approximated by a neural network configured to parametrize the off-diagonal elements and construct the matrix so that the interconnection matrix is skew-symmetric.

4. The system of claim 1, wherein the desired potential energy function is approximated by a neural network configured to parametrize a property of zero value for a state of position and momentum both at zero value.

5. The system of claim 4, wherein the desired potential energy function is positive definite at the origin.

6. The system of claim 1, wherein the neural network module used to approximate the desired potential energy is configured as an input convex neural network that applies a convex activation function.

7. The system of claim 1, wherein the neural network module used to approximate the desired potential energy is configured parametrize the function using input-invex neural networks.

8. The system of claim 1, wherein the conditions further include Lyapunov stability.

9. The system of claim 1, wherein the conditions further include a matching condition that adds a penalty term in the loss function akin to physics informed neural network.

10. The system of claim 1, further comprising a control synthesizer module configured to:
receive estimates of the plurality of functions from the trained model given pairs of state variables for momentum and position; and
generate controller inputs for the underactuated robotic manipulator using an interconnection and damping assignment passivity-based control (IDA-PBC) method based on an energy shaping control component and a damping injection control component.

11. A computer-implemented method for generating a feedback control input to control an under-actuated robotic manipulator, the method comprising:
approximating, by each of a plurality of neural network modules, one of a plurality of functions related to an underactuated controller for a robotic manipulator, wherein the plurality of functions includes a desired mass, a desired potential energy, and an interconnection matrix;
wherein parameters of each function are learned during training of the model using a loss function that satisfies one or more conditions including structure preservation, integrability and equilibrium assignment;
wherein the trained model generates a desired mass matrix and a desired potential energy matrix to enable synthesis of a feedback controller input.

12. The method of claim 11, wherein the desired mass function is approximated by a neural network configured as a feed-forward neural network to parametrize a lower-triangular matrix L of a decomposed desired mass matrix $M_d$, where $M_d=LL^T$.

13. The method of claim 11, wherein the interconnection matrix function is approximated by a neural network configured to parametrize the off-diagonal elements and construct the matrix so that the interconnection matrix is skew-symmetric.

14. The method of claim 11, wherein the desired potential energy function is approximated by a neural network configured to parametrize a property of zero value for a state of position and momentum both at zero value.

15. The system of claim 14, wherein the desired potential energy function is positive definite at the origin.

16. The system of claim 11, wherein the neural network module used to approximate the desired potential energy is configured as an input convex neural network that applies a convex activation function.

17. The system of claim 11, wherein the neural network module used to approximate the desired potential energy is configured parametrize the function using input-invex neural networks.

18. The method of claim 11, wherein the conditions further include Lyapunov stability.

19. The method of claim 11, wherein the conditions further include a matching condition that adds a penalty term in the loss function akin to physics informed neural network.

20. The method of claim 11, further comprising:
receiving estimates of the plurality of functions from the trained model given pairs of state variables for momentum and position; and
generating controller inputs for the underactuated robotic manipulator using an interconnection and damping assignment passivity-based control (IDA-PBC) method based on an energy shaping control component and a damping injection control component.

\* \* \* \* \*